Feb. 19, 1963 H. KERKOW 3,077,814
PICTURE PROJECTION AND PHOTOGRAPHY
Filed Jan. 27, 1958 2 Sheets-Sheet 1

INVENTOR.
Herbert Kerkow
BY
Munn, Liddy, Daniels & March
ATTORNEYS

Feb. 19, 1963 H. KERKOW 3,077,814
PICTURE PROJECTION AND PHOTOGRAPHY
Filed Jan. 27, 1958 2 Sheets-Sheet 2
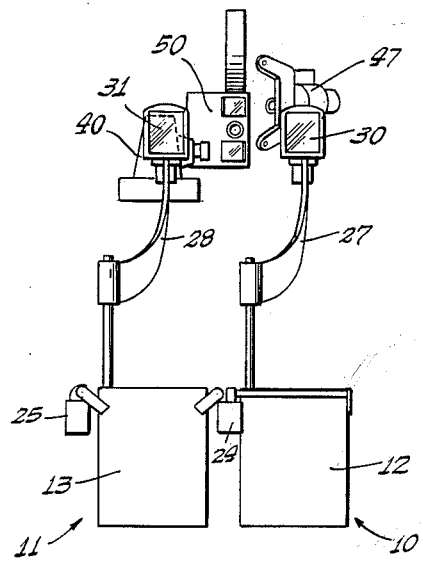
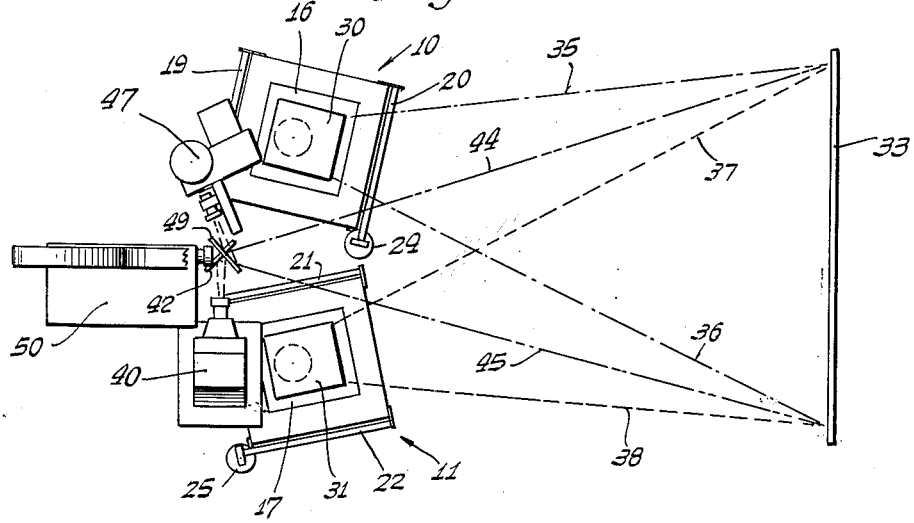
INVENTOR.
Herbert Kerkow
BY
Munn, Liddy, Daniels & March
ATTORNEYS

United States Patent Office 3,077,814
Patented Feb. 19, 1963

3,077,814
PICTURE PROJECTION AND PHOTOGRAPHY
Herbert Kerkow, 480 Lexington Ave., New York, N.Y.
Filed Jan. 27, 1958, Ser. No. 711,330
1 Claim. (Cl. 88—16)

This invention relates to the projection of pictures or images and the photography of the projected images.

An object of the present invention is to provide a novel and improved apparatus for producing various combination or composite still and moving, superimposed photographic effects on a screen and for recording such effects on film.

Another object of the invention is to provide an improved apparatus for producing composite, including manipulated, images on a screen and photographing the same to obtain moving pictures having novel and unique effects.

A further object of the invention is to provide an improved apparatus for producing and combining manipulated and still images, and recording the same on motion picture film.

Yet another object of the invention is to provide a novel means for producing and combining projected images from manipulated or shifted transparencies with projected moving picture images, and for recording the same on photographic film.

A feature of the invention resides in the provision of novel apparatus including one or more overhead projectors as above set forth, wherein certain projected images may be dissolved one into another, wiped one on another, or superimposed on each other, to create animation or motion of, and novel effects from the superimposed images.

In accomplishing the above objects, I provide a novel apparatus comprising projectors commonly known as "overhead projectors" having image-shifting means, a still projector and a moving picture projector all arranged in conjunction with a common highly-reflective screen and a moving picture camera focussed on said screen, by which organization relatively slow exposure motion picture film may be used without special or excessively bright projection lights such as arc lights. The motion picture camera, being positioned on a perpendicular center line from the screen, receives a uniform intensity of light therefrom, resulting from concentrated reflections of the projected images from the "overhead" projectors, slide projector and moving picture projector, resulting in an extremely clear and sharp picture.

Other features and advantages will hereinafter appear.

In the drawings accompanying this specification similar characters of reference are used to denote similar components wherever possible throughout the several views, in which:

FIG. 2 is a front elevational view of the apparatus shown in FIG. 1.

FIG. 3 is a top plan view of the apparatus shown in FIGS. 1 and 2.

Figure 1:
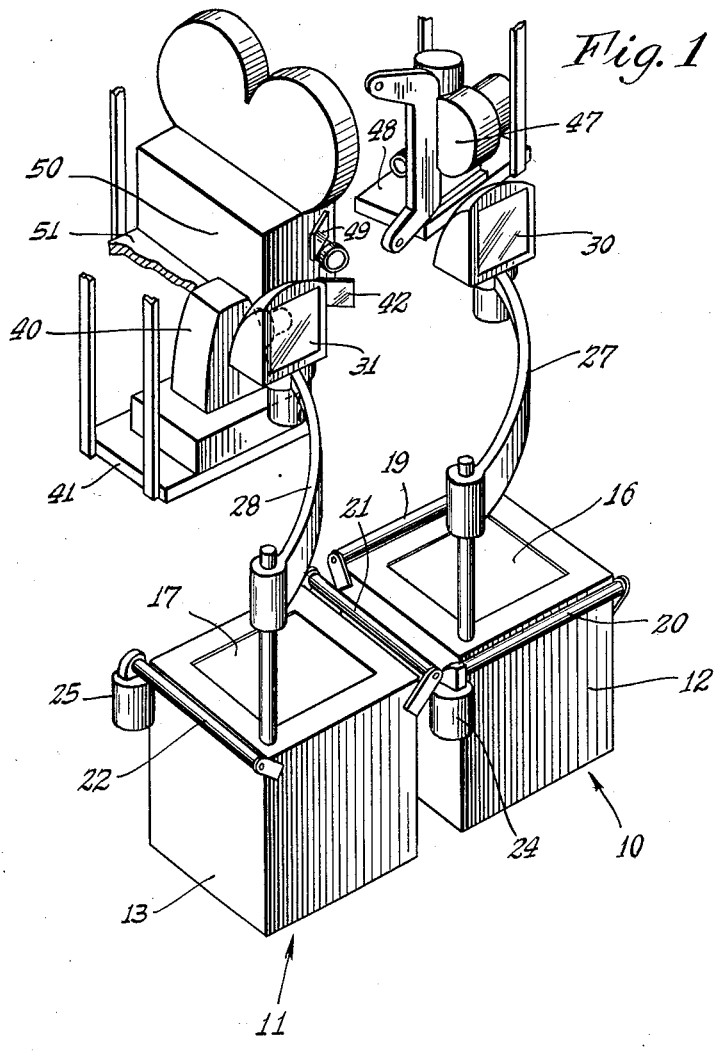
FIGURE 1 is a perspective view of an improved projection and camera apparatus made in accordance with the invention.

Referring to the drawings, the present improved apparatus for producing combined or blended, superimposed and/or dissolved projected moving and still images and manipulated or traveled images, and for recording the same on motion picture film comprises a combination of transparency projectors known also as "overhead projectors," having means for manipulating or traveling the transparencies in different directions, in conjunction with a slide film projector, a motion picture projector, and a motion picture camera. The said transparency projectors are indicated generally by the numerals 10 and 11 in the figures. Such projectors may comprise enclosure or base housing portions 12 and 13, constituting bases and adapted to contain sources of illumination, light condensers and reflectors (all not shown), and comprise transparent table surafces 16 and 17 disposed across the tops of the base housing portions 12 and 13.

As clearly seen in FIG. 1, rollers 19, 20, 21 and 22 are carried along upper opposite edges of the housings 12 and 13, to constitute guides or holders on which the transparencies, in the form of film, may be disposed to locate the images thereof over the transparent table surfaces 16 and 17.

Motivated drive devices 24 and 25 are connected with the rollers 20 and 22 respectively, for causing the latter to turn slowly whereby the film overlying the table surfaces 16 and 17 may be caused to travel. It will be observed that the rollers 19 and 20 are at right angles to the rollers 22 and 21 whereby the film carried by one housing will travel at right angles to the film carried by the other housing. This organization results in the projected images being made to travel horizontally and vertically, as will be later brought out in detail.

The "overhead" projectors 10 and 11 include upright supports or stanchions 27 and 28 having at their upper extremities mirror and lens means 30 and 31 by which the images projected upwardly through the transparencies disposed on the table surfaces 16 and 17 are changed or redirected from the vertical to horizontal direction, and by which such images may be directed both against a single screen 33 as shown in FIG. 3. In this figure the projection from the lens and mirror means 30 is indicated by the broken lines 35 and 36, and the projection from the lens and mirror means 31 is indicated by the broken lines 37 and 38. It will be noted that the two projections become superimposed on the screen 33.

By the present invention, the screen 33 is of the highly reflective type, and this is an important feature of the invention, as will be later brought out.

My present improved apparatus further comprises a slide projector 40 which may be mounted on a hung support or platform 41, and a mirror 42 by which the projected image from the projector 40 is redirected, following the broken lines 44 and 45 shown in FIG. 3, thereby to strike the screen 33 and become superimposed on the images from the "overhead" projectors 10 and 11.

I additionally provide a motion picture projector 47, which may be carried on a hung platform 48, in conjunction with a mirror 49 by which the projection from the projector 47 may be redirected so as to strike the screen 33. Such projection may also be considered as defined by the broken lines 44 and 45 in FIG. 3.

In accordance with the above organization it is possible to obtain a wide variety of different, desired images for producing novel and unique photographic effects on the screen 33. Still images may be projected by the slide projector 40. Either still or manipulated (such as traveling) images may be projected by the "overhead" transparency projectors 10 and 11, and the direction of travel of one image may be horizontal while that of the other may be vertical. Further, there may be superimposed on such still and manipulated images a moving picture image from the moving picture projector 47. The said images may be combined, dissolved one into the other, wiped one on another, superimposed and otherwise utilized to create animation and motion, thereby to obtain a wide variety of novel photographic effects.

In connection with the above I further provide a moving picture camera 50, which may be carried by a hung platform 51, such camera being aimed at and focussed on the screen 33 whereby all of the photographic effects and images shown on such screen may be recorded with their movements or animation on motion picture film. It will be noted that the upright supports 27 and 28 provide a common mount for the projectors, camera and the mirror and lens of the transparency projectors.

By the use of the highly reflective screen 33, which may be of the type known commercially as "Scotchlite" I have found that high-intensity projection lights such as arc lights are unnecessary and undesirable, and further that relatively slow exposure film may be used in the motion picture camera 50. By virtue of such camera being positioned along a normal or perpendicular center line from the screen 33, as clearly seen in FIG. 3, uniform intensity, concentrated reflections are photographed or impinge on the film in the camera 50. With such organization, extremely clear pictures are obtained, without hot spots on the image which otherwise occurs when arc lights or other concentrated lights are employed to illuminate the subject which is then photographed by reflection from an ordinary projection screen or photographed, as it is projected, through a regular background projection screen.

It will now be understood from a consideration of the foregoing that I have provided a simple and effective, novel means and apparatus for creating and producing a wide variety of photographic effects including still pictures and pictures in motion, images superimposed on each other, images traveling in different directions and blended or dissolved, or wiped one over the other.

All such effects may be caught by the motion picture camera 50 and faithfully reproduced on motion picture film, thereby to provide a composite of said effects, on a single recording medium. I have found that my improved apparatus is extremely simple and yet effective in producing the desired result. The equipment is relatively inexpensive, and is adaptable to adjustment and modification to meet various conditions and requirements of use.

Variations and modifications may be made within the scope of the claim, and portions of the improvements may be used without others.

I claim:

An apparatus for use in composite photography, the combination of two overhead transparency projectors adaped to be placed in close assemblage with one another, each of said transparency projectors having a base housing portion, transparent table surfaces overlying the top thereof, and spaced rollers carried by the housing portions for guiding film over the transparent table surfaces, the rollers of one base portion lying at right angles to the rollers of the other base portion whereby two films can be respectively directed over the respective base portions at right angles to one another, means associated with the rollers of each base housing portion to turn the same and cause the travel of the film over the transparent table surface thereof, an upright support extending upwardly from each base portion to equal heights and overlying the table surface thereof, a mirror and lens portion mounted upon the upper end of each upright support and adapted to project the image of the film traveling over the transparent table surfaces forwardly onto a high reflectance screen, a moving picture camera carried on one of the upright supports and adapted to have its lens head extending with the mirror and lens portions towards and normal to the reflectance screen, said camera carrying oppositely inclined mirrors lying respectively above and below the camera projection lens head, a slide projector mounted on one of the upright supports and adapted to project an image on one of the inclined mirrors on the camera and a moving picture projector adapted to project a moving image on the other of said inclined mirrors, the said mirrors on the camera being adapted to reflect the images imposed upon them by the slide and moving picture projectors upon the high reflectance screen whereby said camera and said projectors are disposed in definite relation to one another and compact assemblage for projecting and photographing composite images provided by the transparency, slide and moving picture projectors.

References Cited in the file of this patent

UNITED STATES PATENTS

| | | |
|---|---|---|
| 1,627,976 | Knechtel | May 10, 1927 |
| 1,706,897 | Ott | Mar. 26, 1929 |
| 1,738,942 | Brenkert et al. | Dec. 10, 1929 |
| 2,028,863 | Briel | Jan. 28, 1936 |
| 2,154,890 | Dashkin | Apr. 18, 1939 |
| 2,198,815 | Haskin | Apr. 30, 1940 |
| 2,276,392 | Headley | Mar. 17, 1942 |
| 2,501,958 | O'Brien | Mar. 28, 1950 |
| 2,512,256 | O'Connor | June 20, 1950 |
| 2,727,427 | Jenkins | Dec. 20, 1955 |
| 2,727,429 | Jenkins | Dec. 20, 1955 |
| 2,745,901 | Owens | May 15, 1956 |
| 2,754,722 | Howell et al. | July 17, 1956 |
| 2,857,806 | Shuftan | Oct. 28, 1958 |